United States Patent
Lee

(10) Patent No.: US 11,605,293 B2
(45) Date of Patent: Mar. 14, 2023

(54) PARKING GUIDANCE APPARATUS AND METHOD

(71) Applicant: SK TELECOM CO., LTD., Seoul (KR)

(72) Inventor: Seongsoo Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 160 days.

(21) Appl. No.: 17/054,984

(22) PCT Filed: Nov. 19, 2018

(86) PCT No.: PCT/KR2018/014168
§ 371 (c)(1),
(2) Date: Nov. 12, 2020

(87) PCT Pub. No.: WO2019/225820
PCT Pub. Date: Nov. 28, 2019

(65) Prior Publication Data
US 2021/0327272 A1 Oct. 21, 2021

(30) Foreign Application Priority Data
May 21, 2018 (KR) .......................... 10-2018-0057738

(51) Int. Cl.
*G08G 1/14* (2006.01)
(52) U.S. Cl.
CPC .................................... *G08G 1/143* (2013.01)
(58) Field of Classification Search
CPC ............. G08G 1/143; G08G 1/096811; G08G 1/0969; G08G 1/146; G08G 1/14;
(Continued)

(56) References Cited

U.S. PATENT DOCUMENTS

| 11,125,577 B2 * | 9/2021 | Alneghaimish .......... G08G 1/04 |
| 2014/0118167 A1 * | 5/2014 | Im .................... G08G 1/096758 340/901 |

(Continued)

FOREIGN PATENT DOCUMENTS

| JP | 08-293097 A | 11/1996 |
| KR | 10-2004-0002361 A | 1/2004 |

(Continued)

OTHER PUBLICATIONS

PCT International Search Report and Written Opinion, PCT Application No. PCT/KR2018/014168, dated Feb. 28, 2019, 11 pages (with English translation of International Search Report).

*Primary Examiner* — Daryl C Pope
(74) *Attorney, Agent, or Firm* — Fenwick & West LLP

(57) ABSTRACT

A parking guidance apparatus according to an embodiment comprises: a storage unit for storing parking state information of a parking slot within a predetermined space; a communication unit for receiving, from a first vehicle, occupancy state information 0 of at least a part of the parking slot in the predetermined space; an update unit for updating the parking state information by using the received occupancy state information; and a control unit for, when the parking state information for the predetermined space is requested by a second vehicle through the communication unit, providing the second vehicle with a parking slot, which is in a parking-available state, determined on the basis of the updated parking state information.

11 Claims, 8 Drawing Sheets

(58) Field of Classification Search
CPC ..... G08G 1/0968; G08G 1/168; B60W 40/02; B60W 2420/52; B60W 2420/54; B60W 2556/45; G01C 21/3453
See application file for complete search history.

(56) References Cited

U.S. PATENT DOCUMENTS

| | | | |
|---|---|---|---|
| 2016/0098929 A1* | 4/2016 | Nakhjavani | G08G 1/0175 340/932.2 |
| 2017/0025008 A1* | 1/2017 | Gignac | G06V 20/586 |
| 2018/0313661 A1* | 11/2018 | Eyster | G08G 1/144 |

FOREIGN PATENT DOCUMENTS

| | | |
|---|---|---|
| KR | 10-2014-0120489 A | 10/2014 |
| KR | 10-1691312 B1 | 12/2016 |
| KR | 10-2017-0018563 A | 2/2017 |

* cited by examiner

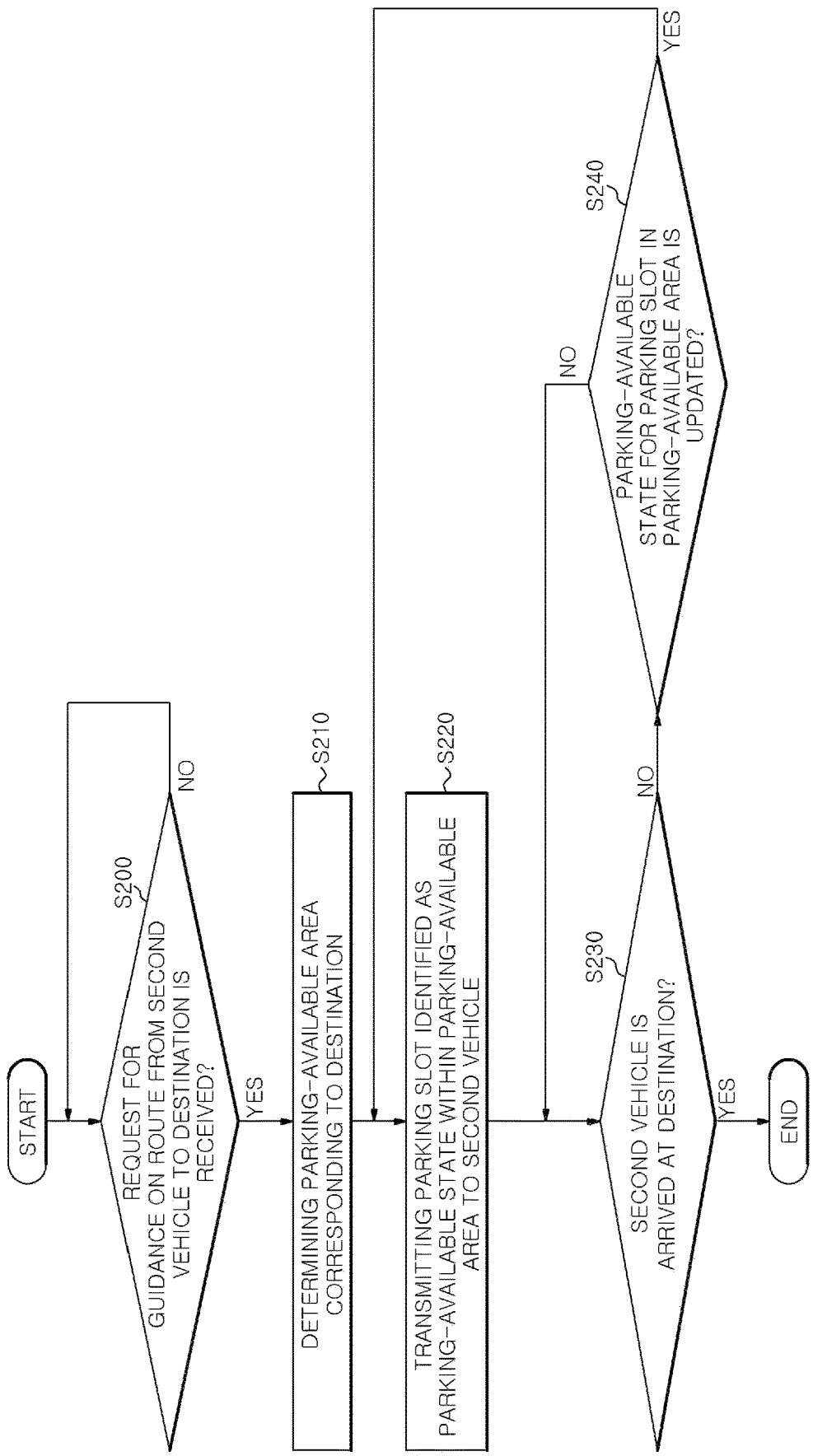

PARKING GUIDANCE APPARATUS AND METHOD

CROSS-REFERENCE TO RELATED APPLICATION

This application claims priority to Korean Patent Application No. 10-2018-0057738, filed on May 21, 2018. The entire contents of the application on which the priority is based are incorporated herein by reference.

TECHNICAL FIELD

The present disclosure relates to a parking guidance apparatus and a parking guidance method for guiding a parking-available parking slot.

BACKGROUND

A vehicle is one of a transportation means capable of moving humans, objects, or animals from one location to another location while running along a road or a track. The vehicle may include a vehicle with three wheels or a vehicle with four wheels, a vehicle with two wheels such as a motorcycle, a construction machine, a motor bicycle, a bicycle, and a train running on the track, and the like.

Recently, researches on autonomous vehicles that may travel, by themselves, to a given destination by recognizing a surrounding environment and controlling the vehicles as determining a driving situation without intervention of drivers have been actively conducted.

On the other hand, the autonomous vehicles arriving at the destination may search for parking-available parking slots while traveling around the destination. At this time, since a time to search for the parking slots is an additional time required even after the vehicles arrived at the destination, it may cause inconvenience to the drivers.

SUMMARY

As described above, since a time for a vehicle arriving at a destination to search for a parking-available parking slot is required separately from an actual traveling time, convenience of a driver may be degraded. To solve the above problem, a separate sensor is provided in a specific parking space to provide parking state information to the vehicle, but cost of building facilities and maintenance are high.

Accordingly, the present disclosure provides a technology that collects occupancy state information of a parking slot through a vehicle, updates parking state information of the parking slot by using the occupancy state information, and provides a vehicle with a parking-available parking slot.

In addition, the present disclosure provides a technology for increasing an accuracy of the provided parking-available parking slot when the above-described technology is performed.

In accordance with an aspect of the present disclosure, there is provided a parking guidance apparatus comprising: a storage configured to store parking state information of a parking slot within a predetermined space; a transceiver configured to receive, from a first vehicle, occupancy state information of at least one of the parking slot in the predetermined space; and a processor configured to update the parking state information by using the received occupancy state information, and provide the second vehicle with a parking slot, which is in a parking-available state, determined on the basis of the updated parking state information when the transceiver receives a request for a parking slot guidance for the predetermined space from a second vehicle.

In accordance with another aspect of the present disclosure, there is provided a parking guidance method performed by a vehicle, the parking guidance method comprising: obtaining first occupancy state information of a first parking slot where the vehicle parks or leaves; obtaining second occupancy state information of a second parking slot in a sensing area of the vehicle while driving; and transmitting, to a parking guidance apparatus, at least one of the first occupancy state information and the second occupancy state information, which makes the parking guidance apparatus to update parking state information of each parking slot stored in the parking guidance apparatus.

In accordance with still another aspect of the present disclosure, there is provided a non-transitory computer-readable storage medium including computer executable instructions, wherein the instructions, when executed by a processor, cause the processor to perform a parking guidance method, the method comprising: obtaining first occupancy state information of a first parking slot where the vehicle parks or leaves; obtaining second occupancy state information of a second parking slot in a sensing area while driving; and transmitting, to a parking guidance apparatus, at least one of the first occupancy state information and the second occupancy state information, which makes the parking guidance apparatus to update parking state information of each parking slot stored in the parking guidance apparatus.

A parking guidance apparatus and a parking guidance method according to one embodiment may receive occupancy state information of the parking slot from the vehicle, and thus may provide the parking-available parking slot without building a separate facility. Further, since the parking guidance apparatus and the parking guidance method receive the occupancy state information on the parking slot in a real time, and update the parking state information based on the occupancy state information, it is possible to increase an accuracy of determining the parking-available parking slot.

BRIEF DESCRIPTION OF THE DRAWINGS

FIG. 8 shows a flowchart illustrating a method of providing parking state information performed by a parking guidance apparatus according to another embodiment.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
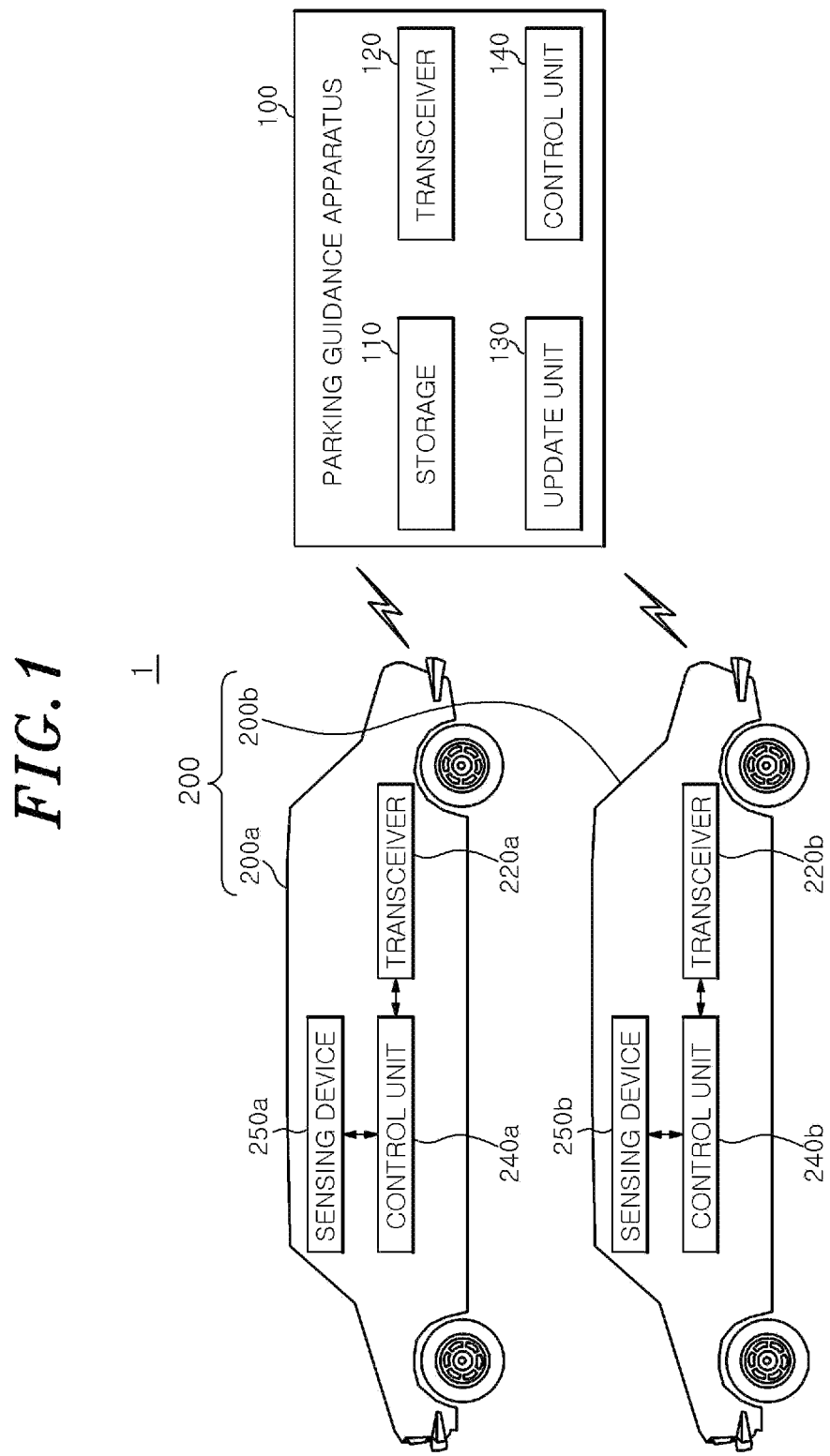
FIG. 1 shows a block diagram of a parking guidance system according to one embodiment.

FIG. 1 shows a block diagram of a parking guidance system according to one embodiment.

The parking guidance system 1 according to one embodiment may include a parking guidance apparatus 100 and a vehicle 200.

The parking guidance apparatus 100 according to one embodiment may be implemented as a type of a server providing navigation information, or be provided to interwork with the server, and may transmit and receive navigation information including parking guidance information in relation to the vehicle 200. Herein, the navigation information may include a route from a current location of the vehicle 200 to a destination and information related thereto.

Typically, when the vehicle transmits, to the server, a request for guidance on the route to the destination, the server may provide the vehicle with at least one route to the destination from the current location of the vehicle. At this time, if a parking space for the vehicle is not provided at the destination or there is no parking-available parking slot in the parking space, the driver may park the vehicle in a parking space around the destination and then may move to the destination. If the vehicle is capable of autonomous driving, the vehicle may travel itself to the parking space around the destination.

Accordingly, the vehicle may need information on the parking space around the destination as well as the route to the destination. In order to collect the information on the parking space around the destination, the driver may directly drive the vehicle to search for the parking space and parking slots around the destination, or the vehicle capable of autonomous driving may directly search for the parking space and the parking slots around the destination. As a result, it may take an additional time to search for the parking space and the parking slots other than a driving time to the destination.

In some parking spaces, a sensor for each parking slot may be provided to provide, to the vehicle and/or the driver, information on the parking space, specifically, information on a parking-available parking slot in the parking space. However, this may require an additional cost of building facilities and maintenance.

To solve the above problem, the parking guidance apparatus 100 according to one embodiment may establish a database (DB) on a state of a parking slot based on occupancy state information of the parking slot detected by the vehicle 200a, and then may provide, by using the DB, the parking slot in a parking-available state to the vehicle 200b that requested guidance on a route to the destination.

Referring to FIG. 1, the parking guidance apparatus 100 according to one embodiment may include a storage 110 for storing parking state information of the parking slot; a transceiver 120 for communicating with the vehicle 200; an update unit 130 for updating the parking state information stored in the storage 110; and a control unit 140 for providing the parking slot in the parking-available state to the vehicle 200 by controlling the transceiver 120.

In the present specification, the update unit 130 and the control unit 140 are described as components that are distinguished from each other, and are implemented as separate hardware, but are not limited thereto. That is, the update unit 130 and the control unit 140 may be implemented with one processor, and in this case, the functions of the update unit 130 and the control unit 140 may be expressed as a series of commands included in one or more programs executed by the processor.

In FIG. 1, a case in which the parking guidance apparatus 100 communicates with the vehicles 200 including a first vehicle 200a and a second vehicle 200b is illustrated. Herein, since the first vehicle 200a and the second vehicle 200b are functionally separated, there is no difference between components therein and operations thereof. In addition, the parking guidance apparatus 100 may communicate with the first vehicle 200a and the second vehicle 200b at a same time or at a different time. Herein, the communicating at the different time may include communicating with a specific vehicle as the first vehicle 200a to perform a first function and then communicating with the same specific vehicle as the second vehicle 200b to perform a second function.

The transceiver 120 may exchange information by communicating with the vehicle 200 in various publicly known communication methods. The transceiver 120 according to one embodiment may communicate with the vehicle 200 through a base station by adopting a publicly known communication method such as CDMA, GSM, W-CDMA, TD-SCDMA, WiBro, LTE, EPC, and the like. Alternatively, the transceiver 120 according to another embodiment may communicate with the vehicle 200 within a predetermined distance by adopting a communication method such as a wireless LAN, Wi-Fi, Bluetooth, Zigbee, Wi-Fi Direct (WFD), Ultra-Wide Band (UWB), Infrared Data Association (IrDA), Bluetooth Low Energy (BLE), and Near Field Communication (NFC), and the like. However, a method in which the transceiver 120 communicates with the vehicle 200 is not limited to the embodiments described above.

The transceiver 120 may receive occupancy state information of the parking slot detected by the vehicle 200. Herein, the occupancy state information may indicate information on whether the parking slot is occupied by the vehicle 200, that is, whether the vehicle 200 is in a parked state.

In order to detect the occupancy state information, the vehicles 200 may include sensing devices 250a and 250b.

Hereinafter, the sensing devices 250a and 250b included in the vehicles 200 will be described in detail with reference to FIG. 2.

Figure 2:
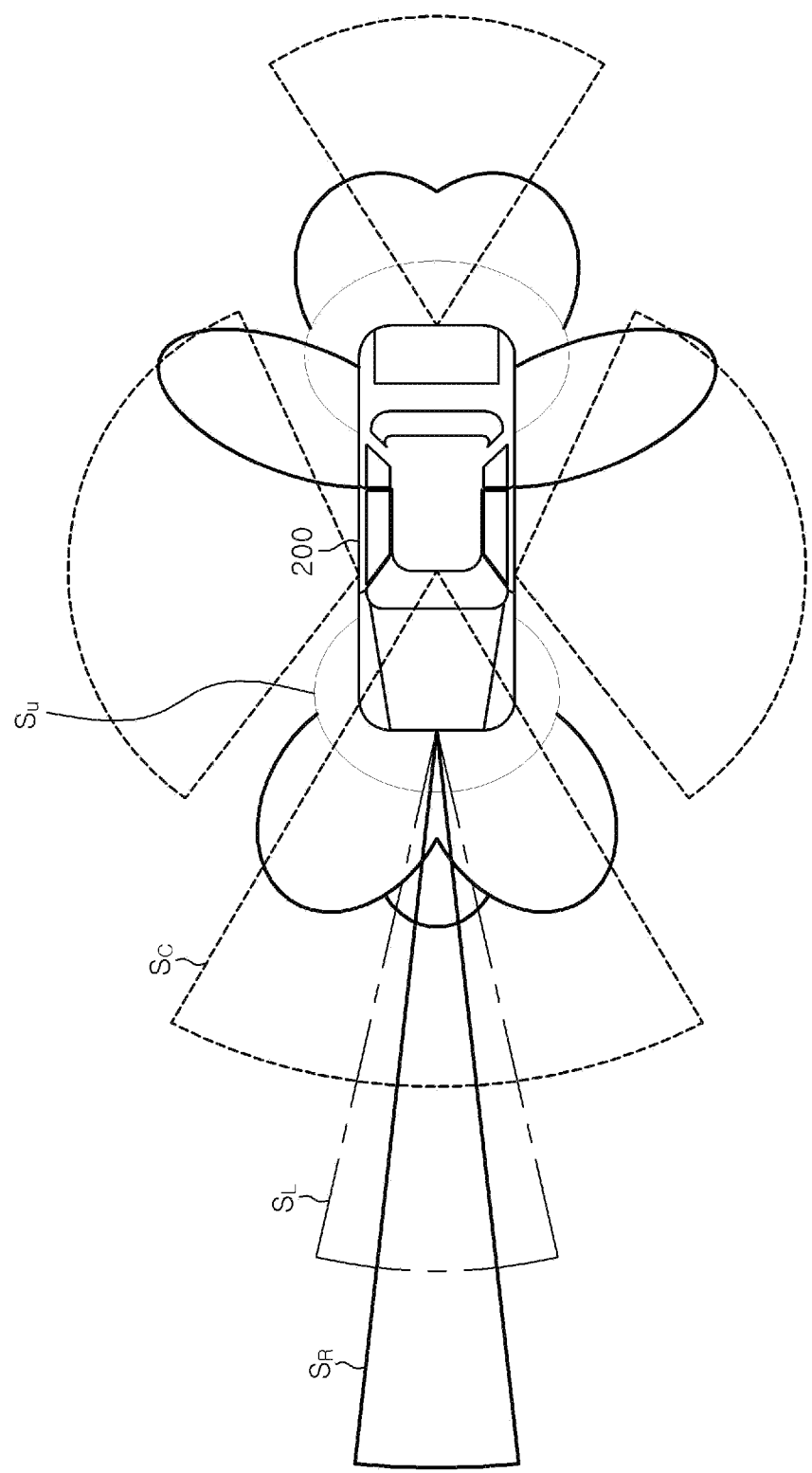
FIG. 2 shows a diagram illustrating a sensing area for occupancy state information around a vehicle according to one embodiment.

FIG. 2 shows a diagram illustrating a sensing area for occupancy state information around the vehicle 200 according to one embodiment.

As described above, the vehicles 200 may detect occupancy state information of a parking slot by using the sensing devices 250a and 250b. To this end, the sensing devices 250a and 250b of the vehicles 200 according to one embodiment may include at least one of a camera, radar, LiDAR, and an ultrasonic sensor.

The camera may be provided to face forward, sideways, and/or rearward from the vehicle 200, and may capture an image in a corresponding direction. The captured image may be a basis for obtaining information such as a traffic lane or a road sign, as well as an object around the vehicle 200 through image processing. Finally, the captured image may be used to implement a Lane Departure Warning System (LDWS), a Lane Keeping Assist System (LKAS), an Auto Emergency Braking (AEB) system, and the like. In FIG. 2, it may be seen that a sensing area detected by the camera according to one embodiment is illustrated as Sc.

The radar may be provided to face forward, sideways, and/or rearward from the vehicle 200, and may emit a pulse in a corresponding direction and receive an echo pulse reflected from an object positioned in the corresponding direction. The received echo pulse may include information not only on existence of the object in the emitting direction of the pulse, but also on a distance to and shape of the object in the corresponding direction. The echo pulse may be used to implement an Adaptive Cruise Control (ACC) system, a Blind Spot Information System (BLIS), and the like. In FIG. 2, it may be seen that a sensing area detected by the radar according to one embodiment is illustrated as SR.

The LiDAR may be provided to face forward, sideways, and/or rearward from the vehicle 200, and may emit a laser in a corresponding direction and receive an echo laser reflected from an object positioned in the corresponding direction. The received echo laser may include information not only on existence of the object in the emitting direction of the laser, but also on a distance to and shape of the object in the corresponding direction. The echo laser may be used to implement a Forward Collision Warning (FCW) system, the AEB system, and the like. In FIG. 2, it may be seen that a sensing area detected by the LiDAR according to one embodiment is illustrated as $S_L$.

The ultrasonic sensor may be provided to face forward, sideways, and/or rearward from the vehicle 200, and may emit an ultrasonic wave in a corresponding direction and receive an echo ultrasonic wave reflected from an object positioned in the corresponding direction. The received echo ultrasonic wave may include information not only on existence of the object in the emitting direction of the ultrasonic wave, but also on a distance to and shape of the object in the corresponding direction. The echo ultrasonic wave may be used to implement a Parking Assist System (PAS), and the like. In FIG. 2, it may be seen that a sensing area detected by the ultrasonic sensor according to one embodiment is illustrated as $S_U$.

Further, the vehicle 200 according to one embodiment may store, in advance, a high definition map to use. Herein, the high definition map may indicate a map that has high accuracy for control over the vehicle 200, and may include information not only on a position on the plane of the road but also on an altitude, slope, curvature, the traffic lane, and the like. The high definition map may further include information on road facilities such as traffic regulation signs, traffic lights, and the like. In addition, the high definition map may further include information on a parking slot in a parking space.

Accordingly, the vehicles 200 including the above-described sensing devices 250a and 250b may identify a location of the vehicle 200 on the high definition map while traveling in the parking space, and then may detect the occupancy state information of the parking slot within the sensing area from the identified location.

Referring to FIG. 1 again, the transceiver 120 may receive the occupancy state information of the parking slot detected by at least one vehicle 200, and in particular, may receive the occupancy state information of separate parking slots from a plurality of the vehicles 200.

The storage 110 may store the parking state information of the parking slot, and the update unit 130 may update the parking state information stored in the storage 110 by using the occupancy state information of the parking slot received through the transceiver 120.

Specifically, the storage 110 may store identification information on a plurality of parking spaces existing in an entire area in which a service is provided and a plurality of parking slots therein, together with the parking state information of each of the plurality of the parking slots. Herein, the parking state information is information for determining whether the parking slot is in the parking-available state, which will be described later.

Further, the storage 110 may store location information of the parking slot into the identification information of each of the plurality of the parking slots.

The storage 110 may list and store the plurality of the parking slots by the parking space, or store the plurality of the parking slots on a parking slot map. Herein, the parking slot map is a map in which the location information of the parking slots is visually displayed, and may share a coordinate system with the high definition map stored in the first vehicle 200a. Hereinafter, it will be described on the assumption that the storage 110 stores the parking state information on the parking slot map.

The update unit 130 may update the parking state information of each parking slot stored in the storage 110 by using the occupancy state information received through the transceiver 120.

Hereinafter, a method of updating the parking state information of the parking slot will be described in detail with reference to FIGS. 3A, 3B, 4, 5A, 5B, and 6.

Figure 3A:
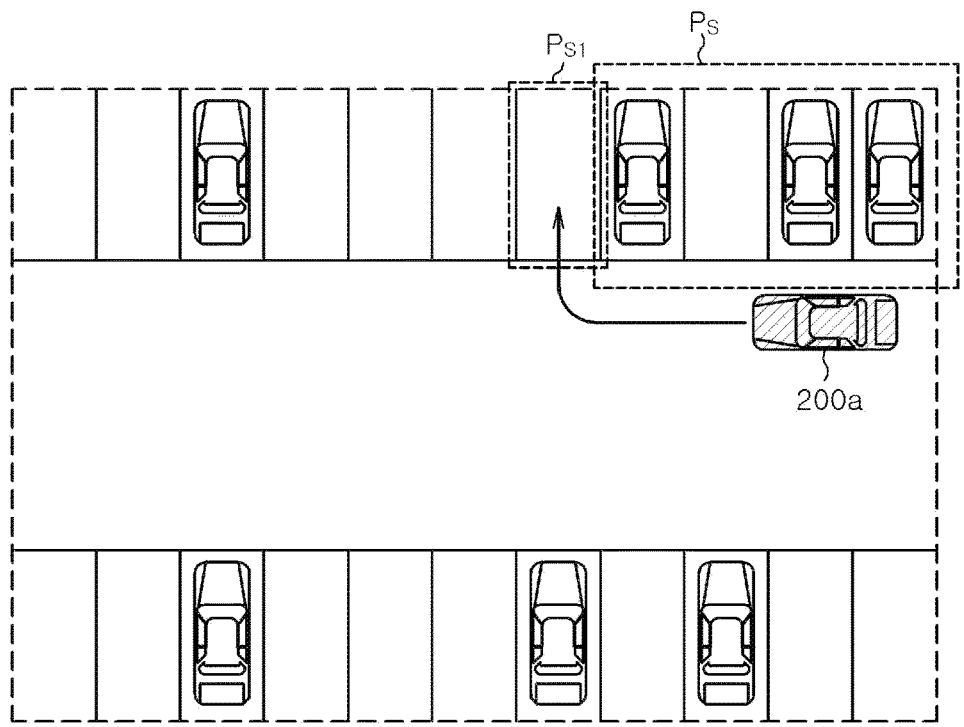
FIG. 3A shows a diagram illustrating a case in which a vehicle detects occupancy state information of a parking slot according to one embodiment.
Figure 3B:
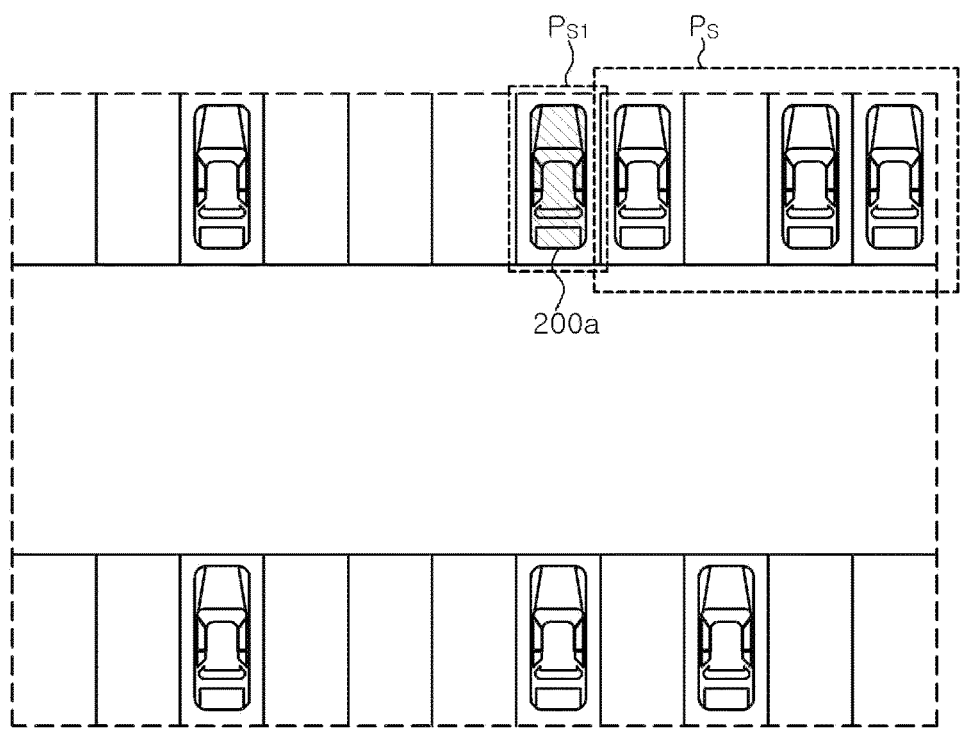
FIG. 3B shows a diagram illustrating a case in which a vehicle detects occupancy state information of a parking slot according to one embodiment.
Figure 4:
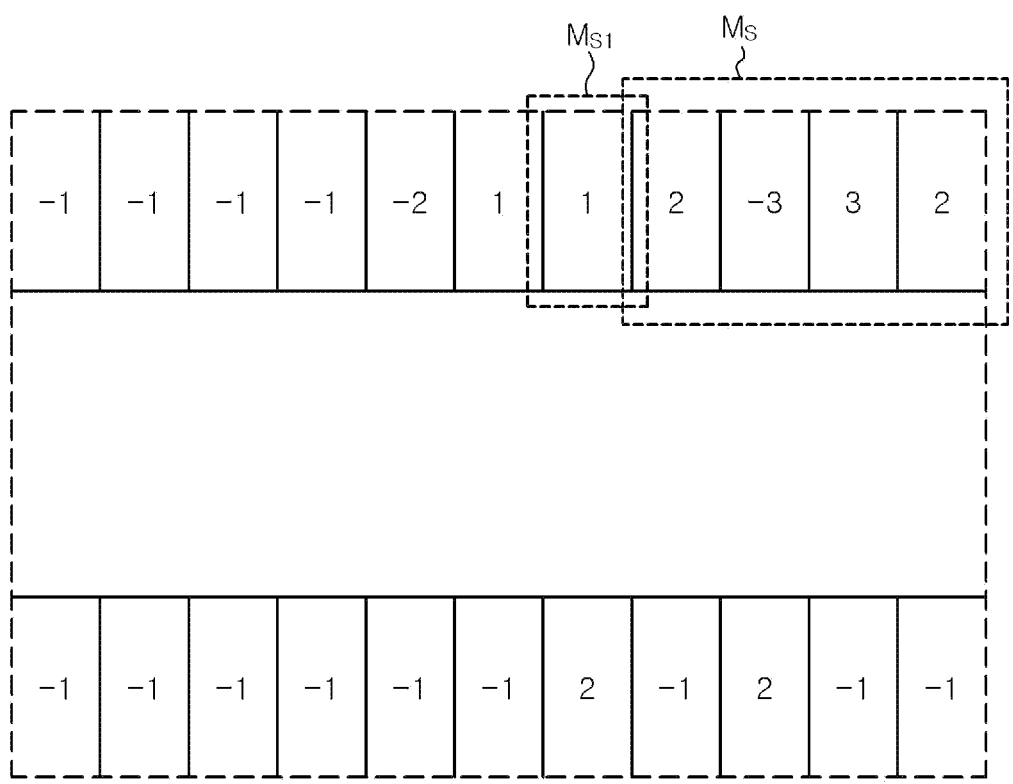
FIG. 4 shows a diagram illustrating a parking slot map in which the occupancy state information, detected by the vehicle illustrated in FIGS. 3A and 3B, is reflected.

FIGS. 3A and 3B show diagrams illustrating a case in which the first vehicle 200a detects occupancy state information of a parking slot according to one embodiment, and FIG. 4 shows a diagram illustrating a parking slot map in which the occupancy state information, detected by the first vehicle 200a illustrated in FIGS. 3a and 3b, is reflected.

FIG. 3A shows a case in which the first vehicle 200a entering a parking space travels in a direction of an arrow to complete parking in a first parking slot $P_{S1}$. In this case, parking slots positioned on a right side of the first vehicle 200a traveling in the direction of the arrow may fall within a sensing area of the first vehicle 200a. Therefore, the first vehicle 200a may detect occupancy state information of second parking slots $P_S$ in the sensing area of the first vehicle 200a until completing the parking in the first parking slot $P_{S1}$.

FIG. 3B shows a case in which the first vehicle 200a illustrated in FIG. 3A completes the parking in the first parking slot $P_{S1}$. The first vehicle 200a having completed the parking may transmit, to the transceiver 120 of the parking guidance apparatus 100, the occupancy state information of the first parking slot $P_{S1}$ in which the first vehicle 200a occupied and the second parking slots $P_S$ detected until completing the parking.

When the occupancy state information is received by the transceiver 120, the update unit 130 may update parking state information stored in the storage 110 by using the received occupancy state information. Referring to FIG. 4, the parking slot map stored in the storage 110 may be provided to correspond to the parking slots on a high definition map stored in the first vehicle 200a. Accordingly, the update unit 130 may identify, on the parking slot map, an area corresponding to the parking slot having the received occupancy state information, and may update the parking state information displayed in the identified area.

Specifically, the update unit 130 may update the parking state information by dividing the received occupancy state information of the parking slots into the occupancy state information of the first parking slot $P_{S1}$ and the occupancy state information of the second parking slots $P_S$.

If the occupancy state information of the first parking slot $P_{S1}$ is received, the update unit 130 may first identify an area $M_{S1}$, which is an area, on the parking slot map, corresponding to the first parking slot $P_{S1}$. Then, since the first parking slot $P_{S1}$ is in an occupancy state, the update unit 130 may initialize the parking state information of the area $M_{S1}$ on the parking slot map to one corresponding to the occupancy state.

Alternatively, in a case of the second parking slots $P_S$ among the plurality of the parking slots of which the occupancy state information is received, the update unit 130 may first identify an area $M_S$, on the parking slot map, corresponding to the plurality of the parking slots of which the occupancy state information is received. Then, the update unit 130 may accumulate the received occupancy state information in the area $M_S$, on the parking slot map, corresponding to the second parking slots $P_S$ according to the occupancy state information of each of the second parking slots $P_S$. Specifically, if the occupancy state information of any one of the second parking slots $P_S$ shows the occupancy state, the update unit 130 may add one to the parking state information of the corresponding parking slot. On the other hand, if the occupancy state information of another parking slot among the second parking slots $P_S$ shows an inoccupancy state, the update unit 130 may subtract one from the parking state information of the corresponding parking slot.

In other words, the update unit 130 may calculate, for each of the second parking slots $P_S$, a difference between the number of the accumulated occupancy states and the number of the accumulated inoccupancy states from a time when the parking state information is initialized, and then may reflect the difference to an initial value to update the parking state information of the corresponding parking slot. For example, if the number of the accumulated occupancy states of any one second parking slot which is initialized to the initial value of one is four and the number of the accumulated inoccupancy states thereof is two, the update unit 130 may update the parking state information of the corresponding parking slot to three which is determined by adding two which is a difference between the accumulated occupancy states of four and the accumulated inoccupancy states of two to the initial value of one. On the other hand, if the number of the accumulated occupancy states of any one second parking slot which is initialized to the initial value of one is two and the number of the accumulated inoccupancy states is four, the update unit 130 may update the parking state information of the corresponding parking slot to minus one which is determined by subtracting two which is a difference between the accumulated occupancy states of two and the accumulated inoccupancy states of four from the initial value of one.

As described above, the parking state information of the second parking slots $P_S$ may be determined based on the initial value, the number of the occupancy states and the number of the inoccupancy states accumulated from the received occupancy state information.

FIGS. 3A, 3B, and 4 illustrate the case in which the first vehicle 200a parks in the first parking slot $P_{S1}$. Hereinafter, a case in which the first vehicle 200a leaves the first parking slot $P_{S1}$ will be described.

Figure 5A:
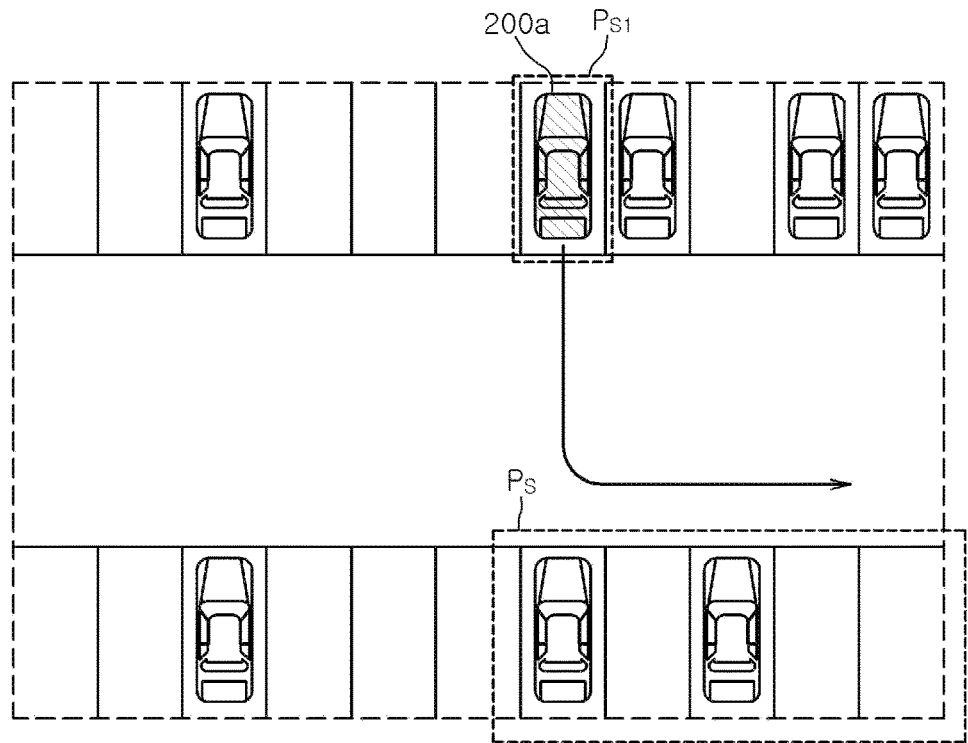
FIG. 5A shows a diagram illustrating a case in which a vehicle detects occupancy state information of a parking slot according to another embodiment.
Figure 5B:
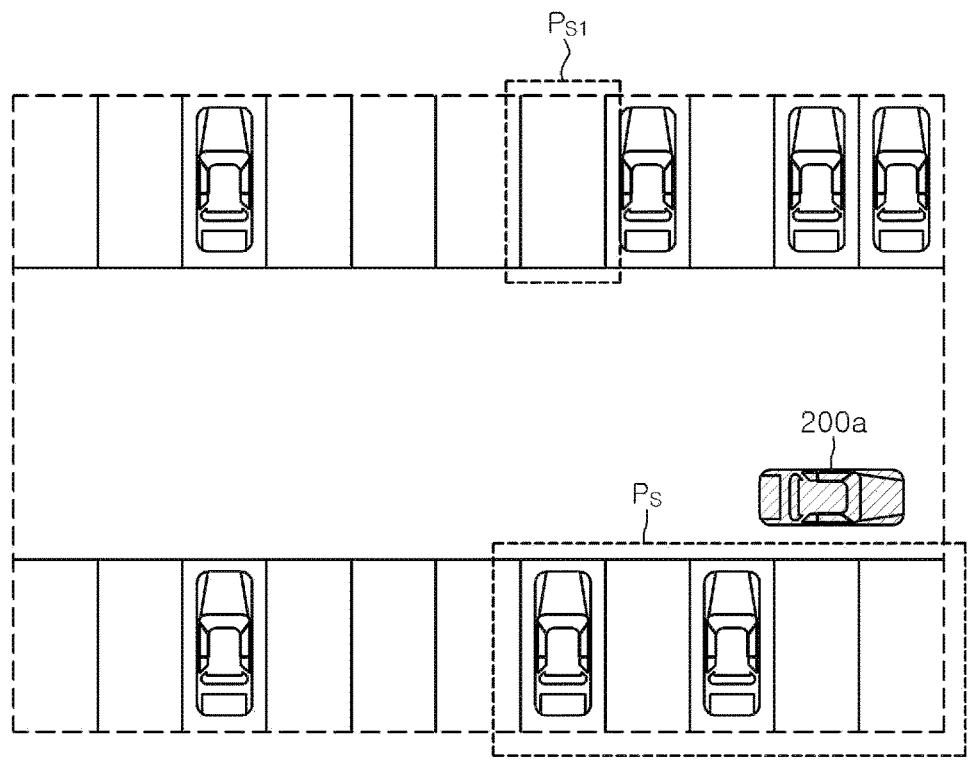
FIG. 5B shows a diagram illustrating a case in which a vehicle detects occupancy state information of a parking slot according to another embodiment.
Figure 6:
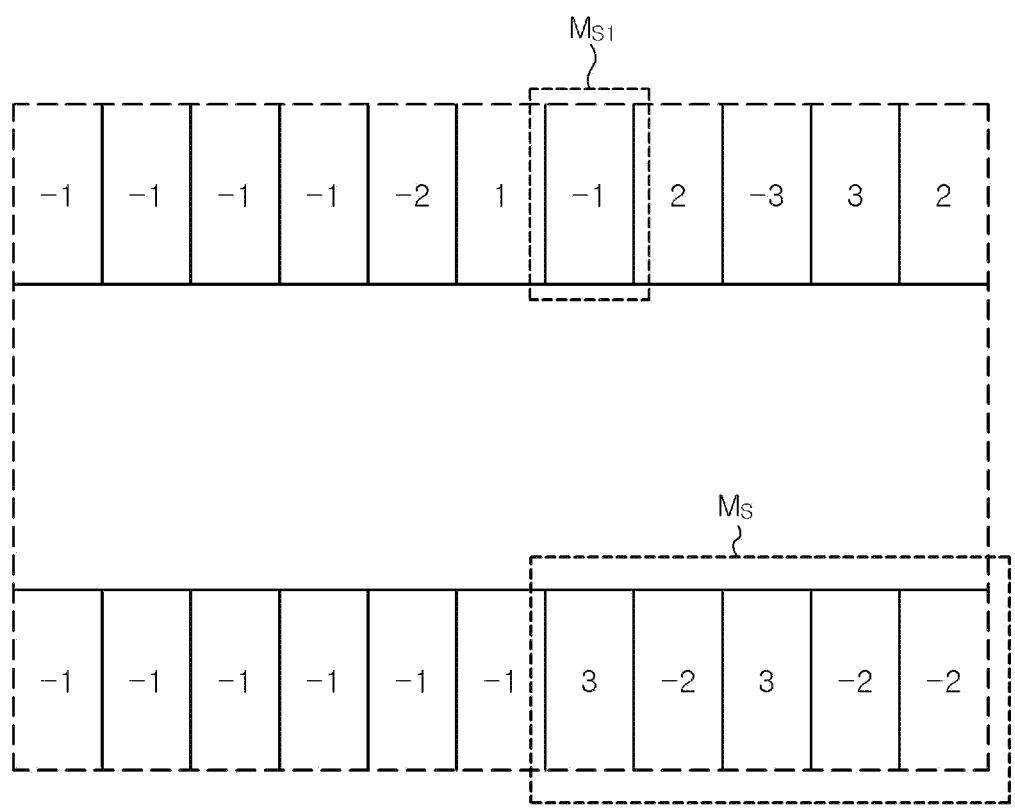
FIG. 6 shows a diagram illustrating a parking slot map in which the occupancy state information, detected by the vehicle illustrated in FIGS. 5A and 5B, is reflected.

FIGS. 5A and 5B show diagrams illustrating a case in which the first vehicle 200a detects occupancy state information of a parking slot according to another embodiment, FIG. 6 shows a diagram illustrating a parking slot map in which the occupancy state information, detected by the first vehicle 200a illustrated in FIGS. 5A and 5B, is reflected.

FIG. 5A shows a case in which the first vehicle 200a, which has completed parking in the first parking slot $P_{S1}$, travels in a direction of an arrow to leave the first parking slot $P_{S1}$. In this case, parking slots positioned on a right side of the first vehicle 200a traveling in the direction of the arrow may fall within a sensing area of the first vehicle 200a. Therefore, the first vehicle 200a may detect occupancy state information of second parking slots $P_S$ until the first vehicle 200a exits a parking space after leaving the first parking slot $P_{S1}$.

FIG. 5B shows a case in which the first vehicle 200a, illustrated in FIG. 5A, which left the first parking slot $P_{S1}$ travels in the parking space. The first vehicle 200a which has completed leaving the parking slot $P_{S1}$, may transmit, to the transceiver 120 of the parking guidance apparatus 100, the occupancy state information of the first parking slot $P_{S1}$ in which the first vehicle 200a left and the second parking slots $P_S$ detected while traveling the parking space.

When the occupancy state information is received by the transceiver 120, the update unit 130 may update parking state information stored in the storage 110 by using the received occupancy state information.

Referring to FIG. 6, the update unit 130 may update the parking state information by dividing the received occupancy state information of the parking slots into the occupancy state information of the first parking slot $P_{S1}$ and the occupancy state information of the second parking slots $P_S$ other than the first parking slot $P_{S1}$.

When the occupancy state information of the first parking slot $P_{S1}$ is received, the update unit 130 may first identify an area $M_{S1}$, which is an area, on the parking slot map, corresponding to the first parking slot $P_{S1}$. Then, since the first parking slot $P_{S1}$ is in an inoccupancy state, the update unit 130 may initialize the parking state information of the area $M_{S1}$ on the parking slot map to minus one corresponding to the inoccupancy state.

Alternatively, in a case of the second parking slots $P_S$ among the plurality of the parking slots of which the occupancy state information is received, the update unit 130 may first identify an area $M_S$, on the parking slot map, corresponding to the second parking slots $P_S$. Then, the update unit 130 may accumulate the received occupancy state information in the area $M_S$, on the parking slot map, corresponding to the second parking slots $P_S$ according to the occupancy state information of each of the second parking slots $P_S$.

Specifically, if the occupancy state information of any one of the second parking slots $P_S$ shows an occupancy state, the update unit 130 may add one to the parking state information of the corresponding parking slot. On the other hand, if the occupancy state information of another parking slot among the second parking slots $P_S$ shows the inoccupancy state, the update unit 130 may subtract one from the parking state information of the corresponding parking slot.

As described referring to FIGS. 3A, 3B, and 4, the update unit 130 may calculate, for each of the second parking slots $P_S$, a difference between the number of the accumulated occupancy states and the number of the inoccupancy states from a time when the parking state information is initialized, and then may reflect the difference to an initial value to update the parking state information of the corresponding parking slot. For example, if the number of the accumulated occupancy states of any one of the second parking slots $P_S$ which is initialized to the initial value of minus one is two and the number of the accumulated inoccupancy states thereof is four, the update unit 130 may update the parking state information of the corresponding parking slot to minus three which is determined by subtracting two which is a difference between the accumulated occupancy states of two and the accumulated inoccupancy states of four from the initial value of minus one. On the other hand, if the number of the accumulated occupancy states of any one of the second parking slots $P_S$ which is initialized to the initial value of minus one is four and the number of the accumulated inoccupancy states is two, the update unit 130 may update the parking state information of the corresponding parking slot to one which is determined by adding two which is a difference between the accumulated occupancy states of four and the accumulated inoccupancy states of two to the initial value of minus one.

As described above, the parking state information of the second parking slots $P_S$ may be determined based on the initial value, the number of the occupancy states and the number of the inoccupancy states accumulated from the received occupancy state information.

Referring to FIG. 1 again, when the control unit 140 identifies the second vehicle 200*b* that tries to park in a parking space through the transceiver 120, the control unit 140 may provide a parking-available parking slot determined based on the updated parking state information. Herein, the parking space in which the second vehicle 200*b* tries to park may indicate a parking space within a predetermined range from a destination of the second vehicle 200*b*. When the transceiver 120 receives a request for guidance on a route to the destination from the second vehicle 200*b*, the control unit 140 may determine a parking space within the predetermined range from the destination. Alternatively, when the transceiver 120 receives a request for guidance on a parking slot from the second vehicle 200*b*, the control unit 140 may determine a parking space within the predetermined range from a current location of the second vehicle 200*b* or the destination of the second vehicle 200*b*.

Then, the control unit 140 may determine a parking slot in a parking-available state based on the updated parking state information. For example, the control unit 140 may determine a state of the corresponding parking slot by comparing the updated parking state information with a predetermined reference value. If the reference value is minus one, the control unit 140 may determine a state of a parking slot having parking state information of minus one or less as the parking-available state. On the other hand, the control unit 140 may determine a state of a parking slot having parking state information exceeding minus one as a parking-unavailable state.

As described above, since the parking-available state of the parking slot is determined based on accumulated data, an accuracy of determination of the parking-available state may be improved.

Finally, the control unit 140 may provide the parking slot in the parking-available state to the second vehicle 200*b*. Herein, there may be one or a plurality of parking slots in the parking-available state provided to the second vehicle 200*b*, and if there are the plurality of the parking slots in the parking-available state, the second vehicle 200*b* may determine any one of the plurality of the parking slots as a final parking slot.

Heretofore, the first vehicle 200*a* transmitting the occupancy state information and the second vehicle 200*b* receiving the parking slot in the parking-available state are described as separate vehicles, however, the first vehicle 200*a* and the second vehicle 200*b* may be the identical vehicle.

Hereinafter, the second vehicle 200*b* that has received the plurality of the parking slots in the parking-available state will be described.

Referring to FIG. 1, the second vehicle 200*b* according to one embodiment may receive a plurality of parking slots in a parking-available state, and may determine any one of the plurality of the parking slots in the parking-available state as a final parking slot, and then may complete parking in the final parking slot.

To this end, the second vehicle 200*b* according to one embodiment may include a transceiver 220*b* for receiving the plurality of the parking slots in the parking-available state from the parking guidance apparatus 100; and a control unit 240*b* for determining the final parking slot among the plurality of the received parking slots.

The transceiver 220*b* may receive the plurality of the parking slots, in the parking-available state, of a specific parking space from the parking guidance apparatus 100. Herein, the specific parking space may indicate a parking space within the predetermined range from the destination of the second vehicle 200*b*.

After receiving the plurality of the parking slots, the control unit 240*b* may generate a route from the destination to each of the plurality of the parking slots, and may obtain traveling times according to the generated routes. In this case, the control unit 240*b* may obtain the traveling time according to each of the routes by reflecting current traffic information.

Then, the control unit 240*b* may determine a parking slot having a shortest traveling time to the destination among the plurality of the parking slots as the final parking slot. Accordingly, it is possible to shorten a traveling time between the destination and the parking slot.

In addition, the control unit 240*b* may determine the final parking slot after arriving at the destination by considering changes in a traffic environment while traveling to the destination. To this end, the transceiver 220*b* may receive a plurality of a parking slots in the parking-available state updated by the parking guidance apparatus 100 until the second vehicle 200*b* arrives at the destination.

On the other hand, the second vehicle 200*b* may change the final parking slot according to the traveling time from the final parking section to the destination even after completing parking in the final parking slot. Specifically, after completing the parking, the control unit 240*b* of the second vehicle 200*b* may identify whether the traveling time from the final parking slot to the destination is greater than or equal to a threshold value. Herein, the threshold value may indicate a minimum traveling time in which the final parking slot needs to be changed.

If the traveling time from the final parking slot to the destination is greater than or equal to the threshold value, the control unit 240b may receive a plurality of updated parking slots in the parking-available state from the parking guidance apparatus 100 through the transceiver 220b. Thereafter, the control unit 240b may generate a route to the destination from each of the plurality of received parking slots, and may determine a parking slot of a route having a shortest traveling time among the generated routes as the final parking slot to travel and park.

Accordingly, it is possible to shorten the traveling time between the destination and the parking slot.

Hereinafter, a method of updating the parking state information and a method of providing the parking state information performed by the parking guidance apparatus 100 illustrated in FIG. 1 will be described.

Figure 7:
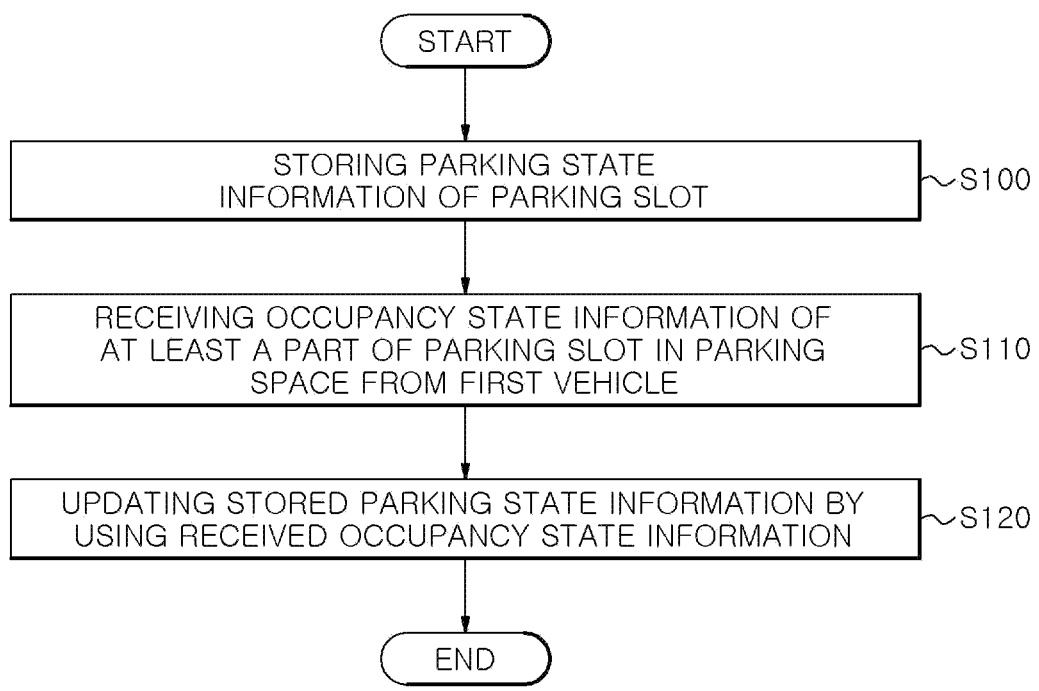
FIG. 7 shows a flowchart illustrating a method of updating parking state information performed by a parking guidance apparatus according to one embodiment.

FIG. 7 shows a flowchart illustrating a method of updating parking state information as a method controlled by the parking guidance apparatus 100 according to one embodiment.

First, in a step S100, the parking guidance apparatus 100 may store parking state information of a parking slot. Herein, the parking state information may indicate information for determining a parking-available state, and may be numerical information.

Next, in a step S110, the parking guidance apparatus 100 may receive occupancy state information of at least a part of a parking slot in a parking space from the first vehicle 200a. Herein, the occupancy state information may include an occupancy state in which the parking slot is occupied by a vehicle, and an inoccupancy state that is not occupied by a vehicle.

In a step S120, when the occupancy state information is received, the parking guidance apparatus 100 may update the stored parking state information by using the received occupancy state information. Specifically, the parking guidance apparatus 100 may update the parking state information by dividing the received occupancy state information into the occupancy state information of the first parking slot $P_{S1}$ where the first vehicle 200a parks or leaves, and the occupancy state information of the second parking slots $P_S$ in which the first vehicle 200a detects around the first parking slot $P_{S1}$.

When the occupancy state information of the first parking slot $P_{S1}$ is received, the parking guidance apparatus 100 may initialize the parking state information of the first parking slot $P_{S1}$ to parking state information corresponding to the occupancy state information. For example, if the parking state information of the first parking slot $P_{S1}$ is three and the first parking slot $P_{S1}$ is in the inoccupancy state, the parking guidance apparatus 100 may initialize the parking state information of the first parking slot $P_{S1}$ to minus one corresponding to the inoccupancy state.

On the other hand, when the occupancy state information of the second parking slots $P_S$ is received, the parking guidance apparatus 100 may update the parking state information of the second parking slots $P_S$ based on the number of the occupancy states and the number of the inoccupancy states accumulated from the received occupancy state information of the second parking slots $P_S$. Specifically, the parking guidance apparatus 100 may update the parking state information by adding one as much as the number of the occupancy states to the initialized parking state information of the second parking slots $P_S$ and subtracting one as much as the number of the inoccupancy states from the initialized parking state information of the second parking slots $P_S$.

FIG. 8 shows a flowchart illustrating a method of providing parking state information as a method controlled by the parking guidance apparatus 100 according to another embodiment.

First, in a step S200, the parking guidance apparatus 100 may identify whether a request for guidance on a route from the second vehicle 200b to a destination has been received. If the request for the guidance on the route is not received, the parking guidance apparatus 100 may repeatedly identify whether the request has been received.

On the other hand, if the request for the guidance on the route is received, in a step S210, the parking guidance apparatus 100 may determine a parking-available area corresponding to the destination. Herein, the parking-available area may indicate an area determined within a predetermined range from the destination.

Then, in a step S220, the parking guidance apparatus 100 may transmit a parking slot identified as a parking-available state within the parking-available area to the second vehicle 200b. To this end, the parking guidance apparatus 100 may compare updated parking state information with a reference value.

After transmitting the parking slot in the parking-available state to the second vehicle 200b, in a step S230, the parking guidance apparatus 100 may identify whether the second vehicle 200b has arrived at the destination. If the second vehicle 200b arrives at the destination, the process ends.

On the other hand, if the second vehicle 200b has not reached the destination, in a step S240, the parking guidance apparatus 100 may identify whether the parking-available state for the parking slot in the parking-available area is updated. If the parking-available state is not updated, the step S240 may proceed to the step S230.

Alternatively, if the parking-available state is updated, the step S240 may proceed to the step S220 so that the parking guidance apparatus 100 may transmit a parking slot identified as the updated parking-available state to the second vehicle 200b.

On the other hand, each of the steps included in the parking guidance method according to one embodiment described above may be implemented in a computer-readable recording medium for storing a computer program programmed to perform each of the steps.

According to one embodiment, the above-described parking guidance apparatus and method may be used in various fields such as a home or an industrial site, and thus may have industrial applicability.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A parking guidance apparatus comprising:
   a storage configured to store parking state information of a parking slot within a predetermined space;

a transceiver configured to receive, from a first vehicle, occupancy state information of at least one of the parking slot in the predetermined space; and a processor configured to update the parking state information by using the received occupancy state information, and provide a second vehicle with a parking slot, which is in a parking-available state, determined based the updated parking state information when the transceiver receives a request for a parking slot guidance for the predetermined space from a second vehicle, wherein the transceiver is further configured to receive occupancy state information of a first parking slot where the first vehicle parks or leaves and occupancy state information of a second parking slot where the first vehicle detects near the first parking slot, wherein the processor is further configured to update, when the transceiver receives the occupancy state information of the second parking slot, the parking state information of the second parking slot by using a difference between the accumulated number of the occupancy states and the accumulated number of the inoccupancy states of the second parking slot from a time when the parking state information of the second parking slot is initialized, and wherein the processor is further configured to determine whether the second parking slot is in a parking-available state based on the difference between the accumulated number of the occupancy states and the accumulated number of the inoccupancy states of the second parking slot.

2. The parking guidance apparatus of claim 1, wherein the processor is further configured to initialize, when the transceiver receives the occupancy state information of the first parking slot, parking state information of the first parking slot to parking state information corresponding to the received occupancy state information of the first parking slot.

3. The parking guidance apparatus of claim 1, wherein the processor is further configured to provide, to the second vehicle, a parking slot in a parking-available state determined based on the updated parking state information if the predetermined space is located within a predetermined range from a destination of the second vehicle.

4. A parking guidance method performed by a vehicle, the parking guidance method comprising:
obtaining first occupancy state information of a first parking slot where the vehicle parks or leaves;
obtaining second occupancy state information of a second parking slot sensed by the vehicle while driving to or from the first parking slot;
transmitting, to a parking guidance apparatus, at least one of the first occupancy state information and the second occupancy state information, causing the parking guidance apparatus to update parking state information of each parking slot stored in the parking guidance apparatus;
transmitting, to the parking guidance apparatus, a request for guidance on parking for a destination;
receiving, from the parking guidance apparatus, parking-available states on a plurality of parking slots in a parking space corresponding to the destination;
generating first routes from the destination to each of a subset of parking slots in the parking-available states; and
determining a final parking slot according to traveling times of the generated first routes.

5. The parking guidance method of claim 4, wherein the vehicle comprises a sensing device including at least one of a radar, a LiDAR, a camera, and an ultrasonic sensor, and wherein the obtaining the second occupancy state information is obtaining the second occupancy state information of the second parking slot within the sensing area of the sensing device.

6. The parking guidance method of claim 4 further comprising:
receiving, from the parking guidance apparatus, a plurality of parking slots in the parking-available states updated after completing parking if a traveling time from the determined final parking slot to the destination is greater than or equal to a threshold value after completing the parking.

7. The parking guidance method of claim 6, further comprising:
generating a second route from each of the plurality of the updated parking slots to the destination; and
changing the final parking slot based on a traveling time according to the second routes.

8. A non-transitory computer-readable storage medium including computer executable instructions, wherein the instructions, when executed by a processor, cause the processor to perform a parking guidance method, the method comprising:
obtaining first occupancy state information of a first parking slot where a vehicle parks or leaves;
obtaining second occupancy state information of a second parking slot sensed by the vehicle while driving to or from the first parking slot;
transmitting, to a parking guidance apparatus, at least one of the first occupancy state information and the second occupancy state information, causing the parking guidance apparatus to update parking state information of each parking slot stored in the parking guidance apparatus;
transmitting, to the parking guidance apparatus, a request for guidance on parking for a destination;
receiving, from the parking guidance apparatus, parking-available states on a plurality of parking slots in a parking space corresponding to the destination;
generating first routes from the destination to each of a subset of parking slots in the parking-available states; and
determining a final parking slot according to traveling times of the generated first routes.

9. The non-transitory computer-readable recording medium of claim 8, wherein the second occupancy state information of the second parking slot is obtained by at least one of a radar, a LiDAR, a camera, and an ultrasonic sensor included in the vehicle.

10. The non-transitory computer-readable recording medium of claim 8, the method further comprising:
receiving, from the parking guidance apparatus, a plurality of parking slots in the parking-available states updated after completing parking if a traveling time from the determined final parking slot to the destination is greater than or equal to a threshold value after completing the parking.

11. The non-transitory computer-readable recording medium of claim 10, the method further comprising:
generating a second route from each of the plurality of the updated parking slots to the destination; and changing the final parking slot based on a traveling time according to the generated second routes.

\* \* \* \* \*